United States Patent
Goodson et al.

(10) Patent No.: US 8,442,074 B1
(45) Date of Patent: May 14, 2013

(54) SYSTEMS AND METHODS FOR PASSING TIMING INFORMATION OVER PACKET NETWORKS

(75) Inventors: Richard Goodson, Huntsville, AL (US);
Stacy Murphree, Harvest, AL (US);
Jason Morgan, Brownsboro, AL (US);
Stuart Venters, Huntsville, AL (US)

(73) Assignee: ADTRAN, Inc., Huntsvillle, AL (US)

( * ) Notice: Subject to any disclaimer, the term of this patent is extended or adjusted under 35 U.S.C. 154(b) by 767 days.

(21) Appl. No.: 12/061,480

(22) Filed: Apr. 2, 2008

Related U.S. Application Data

(60) Provisional application No. 60/909,638, filed on Apr. 2, 2007, provisional application No. 60/964,820, filed on Aug. 15, 2007.

(51) Int. Cl.
*H04J 3/06* (2006.01)

(52) U.S. Cl.
USPC .......................................................... 370/503

(58) Field of Classification Search .................. 370/503, 370/509, 510
See application file for complete search history.

(56) References Cited

U.S. PATENT DOCUMENTS

| | | | | |
|---|---|---|---|---|
| 5,379,074 | A * | 1/1995 | Hwang | 348/606 |
| 6,259,677 | B1 * | 7/2001 | Jain | 370/252 |
| 6,278,718 | B1 | 8/2001 | Eschholz | |
| 6,339,584 | B1 | 1/2002 | Gross et al. | |
| 6,658,025 | B2 | 12/2003 | Mauritz et al. | |
| 6,747,996 | B2 | 6/2004 | Holloway et al. | |
| 6,826,123 | B1 | 11/2004 | Herring | |
| 7,023,883 | B1 | 4/2006 | Lui et al. | |
| 7,079,554 | B2 | 7/2006 | Peled | |
| 7,114,091 | B2 * | 9/2006 | Vrancic | 713/400 |
| 7,139,923 | B1 | 11/2006 | Chapman et al. | |
| 7,200,158 | B2 | 4/2007 | Gustin | |
| 7,242,740 | B2 * | 7/2007 | Spijker et al. | 375/376 |
| 7,656,985 | B1 * | 2/2010 | Aweya et al. | 375/373 |
| 2004/0125824 | A1 | 7/2004 | Preston et al. | |
| 2004/0223518 | A1 | 11/2004 | Repko et al. | |
| 2004/0264477 | A1 | 12/2004 | Repko et al. | |
| 2004/0264478 | A1 | 12/2004 | Van Der Valk et al. | |
| 2005/0053076 | A1 | 3/2005 | Repko et al. | |
| 2005/0186933 | A1 | 8/2005 | Trans | |
| 2007/0116060 | A1 | 5/2007 | Qu | |
| 2007/0153811 | A1 | 7/2007 | Venters et al. | |

OTHER PUBLICATIONS

Goodson, et al., U.S. Appl. No. 12/121,537, entitled, "Systems and Methods for Maintaining Timestamp Synchronization Across Multiple Time Domains in a Packet Network," filed May 15, 2008.
Goodson, et al., U.S. Appl. No. 12/061,480, entitled, "Systems and Methods for Maintaining Timestamp Synchronization . . . ," filed May 15, 2008.
ITU, International Telecommunication Union, "Timing and Synchronization Aspects in Packet Networks," G.8261/Y.1361, May 2006.
IEEE Standards, 1588, "IEEE Standard for a Precision Clock Synchronization Protocol for Networked Measurement and Control Systems," 2002, pp. 10-15.

* cited by examiner

*Primary Examiner* — Mark Rinehart
*Assistant Examiner* — Mohammad Anwar
(74) *Attorney, Agent, or Firm* — Maynard Cooper & Gale, P.C.; Jon E. Holland

(57) ABSTRACT

The present disclosure generally pertains to systems and methods for passing timing information over packet networks. In one exemplary embodiment of the present disclosure, a transmitter inserts a timestamp into various packets being transmitted. A receiver determines the packet delay for each of these packets. The receiver monitors the packet delays of received packets over time to estimate a minimum packet delay for the network. Thereafter, the receiver uses the timestamps of received packets in order to update a local receiver clock signal so that the local receiver clock signal is synchronous to the clock signal used by the transmitter to generate the timestamps. However, the receiver filters the received timestamps such that the effects of packet delay variation to the synchronization of the local clock signals are reduced.

25 Claims, 6 Drawing Sheets

SYSTEMS AND METHODS FOR PASSING TIMING INFORMATION OVER PACKET NETWORKS

CROSS REFERENCE TO RELATED APPLICATIONS

This application claims priority to U.S. Provisional Patent Application No. 60/909,638, entitled "System and Method for Passing Network Timing in a Packet Network using SNTP," and filed on Apr. 2, 2007, which is incorporated herein by reference. This application also claims priority to U.S. Provisional Patent Application No. 60/964,820, entitled "Systems and Methods for Transporting Network Timing over a Packet Network using Time-Stamped Packets," and filed on Aug. 15, 2007, which is incorporated herein by reference.

RELATED ART

When packets are transmitted over a packet network, it is often desirable for the packets to transfer synchronous data signals. For example, an interworking function (IWF), referred to hereafter as the "transmitting IWF," for a packet network may receive a data signal, such as a DS1 signal, and packetize the signal's data for transmission over the packet network. An IWF, referred to hereafter as the "receiving IWF," may receive the packets and regenerate the data signal that was originally packetized by the transmitting IWF. In this regard, the receiving IWF may generate a data signal, referred to hereafter as the "regenerated data signal," that is synchronous to and contains the same data as the original data signal packetized by the transmitting IWF.

To enable the receiving IWF to provide a regenerated data signal synchronous to the original data signal, highly accurate clocks, referred to as "primary reference clocks" (PRCs), are sometimes used by the transmitting and receiving IWFs. Accordingly, each of the IWFs operate according to the same time domain. In this regard, each IWF, through its respective PRC, has access to essentially the same global timing information and can use such timing information to remain synchronous with one another. However, PRCs are relatively expensive, and each IWF may not have direct access to a PRC.

In such situations, other techniques are used for synchronization. For example, in some systems, a transmitting IWF uses a PRC signal to transmit data packets to a network. Each network node along the data path either has access to a PRC signal or is phase-locked to a network node having access to a PRC. The receiving IWF either phase-locks to the transmitting IWF or to one of the network nodes to generate a signal synchronous to the transmitting PRC. However, phase-locking nodes to one another can be problematic and require specialized circuitry, which is not always available.

Some packet-based approaches have been developed to enable timing information to be passed through the network without requiring nodes to be phase-locked to one another. In such systems, the transmitting IWF often utilizes a PRC signal or a clock signal traceable to a PRC signal in order to insert timing information into transmit packets. The transmitting IWF inserts, into packets, timing information, which can be used to appropriately update the timing of a clock signal in the receiving IWF in order to ensure that such signal remains synchronous to the clock signal of the transmitting IWF. However, to work well, the nodes over which the packets pass often must be designed to process the timing information and, therefore, be compatible with the timing synchronization techniques being employed.

In addition, many packet-based approaches are subject to packet delay variation. In this regard, "packet delay" generally refers to the amount of time required for a packet to traverse from a source to a destination. Such delay is often based on various factors, such as the amount of traffic flowing over the network at a given time. Accordingly, even though packets may be transmitted from the same source to the same destination, the packet delay experienced by one packet over a network is often different than the packet delay experienced by another packet over the same network. Such variation in the packet delays of different packets can make it difficult for the receiving IWF to use timing information in received packets to maintain clock synchronization with the transmitting IWF.

What is needed, therefore, is a system for transporting timing of a PRC, using packets, to an IWF that does not have access to a PRC, such that the IWF can effectively generate a signal that is synchronous to the PRC. Ideally, this method would not require that any intermediary network nodes be designed to process the timing information in the packets, and the method should be able to tolerate reasonable values of packet delay variation.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for passing timing information over packet networks. In one exemplary embodiment of the present disclosure, a transmitter inserts a timestamp, referred to herein as a "synchronization timestamp," into various packets being transmitted. This synchronization timestamp is indicative of the time that the packet is transmitted. A receiver determines the packet delay for each of these packets by subtracting two timestamps: a timestamp indicative of when the packet is received and the packet's synchronization timestamp. The receiver monitors the packet delays of received packets over time to estimate a minimum packet delay for the network. Thereafter, the receiver uses the synchronization timestamps of received packets in order to update a local receiver clock signal so that the local receiver clock signal is synchronous to the clock signal used by the transmitter to generate the synchronization timestamps. However, the receiver filters the received synchronization timestamps such that only synchronization timestamps from packets having packet delays within a specified range of the estimated minimum delay are used to update the local clock signal. In this way, the effects of packet delay variation to the synchronization of the local clock signals are reduced.

Figure 1:
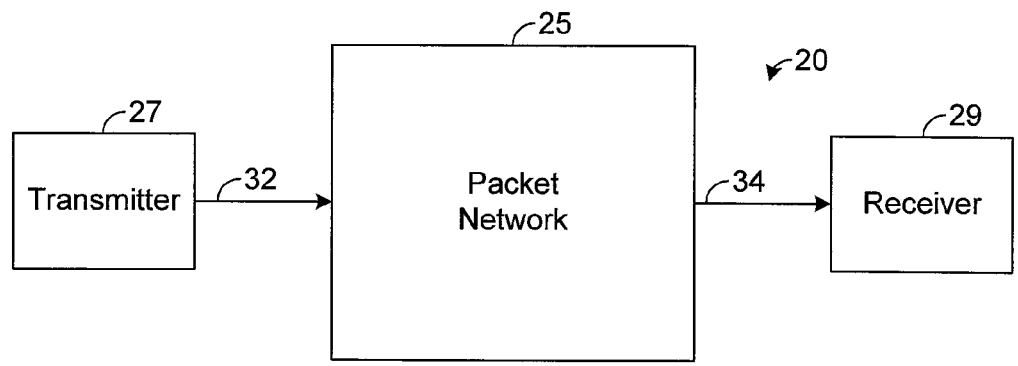
FIG. 1 is a block diagram illustrating an exemplary embodiment of a communication system in accordance with the present disclosure.

FIG. 1 depicts an exemplary embodiment of a communication system 20. The system 20 comprises a packet network 25 that is coupled to a transmitter 27 and a receiver 29. The transmitter 27 is configured to transmit data packets, such as packets in accordance with transmission control protocol/internet protocol (TCP/IP) or other types of packets, to the packet network 25. In one exemplary embodiment, the transmitter 27 transmits such packets via an Ethernet signal 32 that is received by the packet network 25, although other types of signals could be used in other embodiments.

The packets are routed through the network 25 and received by the receiver 29. In one exemplary embodiment, the receiver 29 receives the packets via an Ethernet signal 34, although other types of signals could be used in other embodiments.

Figure 2:
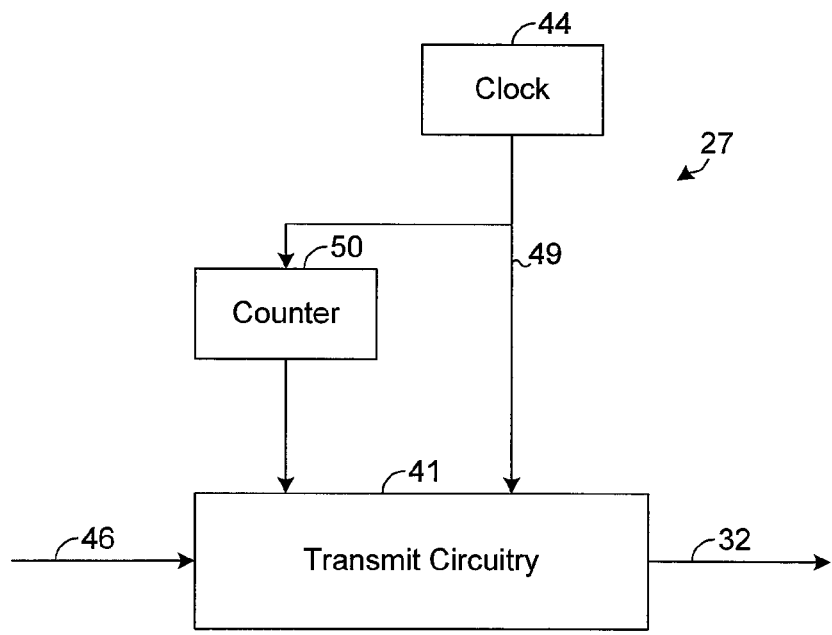
FIG. 2 is a block diagram illustrating an exemplary transmitter, such as is depicted in FIG. 1.

In one exemplary embodiment, the transmitter 27 is implemented within an interworking function (IWF) that receives a data signal, such as a DS1 data signal, for transporting data to a receiving IWF in which the receiver 29 is implemented. FIG. 2 depicts a more detailed view of an exemplary transmitter 27 for such an embodiment. As shown by FIG. 2, the transmitter 27 comprises transmit circuitry 41 and a clock 44. The transmit circuitry 41 receives a data signal 46, such as a DS1 signal, and packetizes the data from such signal 46 into a plurality of data packets for transmission. The transmit circuitry 41 transmits such packets, referred to hereafter as "TDM packets," to the network 25 via signal 32. Note that the transmit circuitry 41 can be implemented in hardware or a combination of hardware with software and/or firmware. In addition, in one embodiment, the transmit circuitry 41 defines the TDM packets according to protocols in accordance with pseudo-wire emulation (PWE), although other protocols may be used in other embodiments.

The clock 44 produces a clock signal 49 for the transmit circuitry 41 and counter 50. The clock signal 49 is either a primary reference clock (PRC) signal or a clock signal that is traceable to a PRC signal. As known in the art, a PRC signal is a highly accurate clock signal. It is often generated by an atomic clock or a clock that uses global positioning system (GPS) signals to achieve a high degree of accuracy. Further, a clock signal is generally traceable to a PRC signal when it is based on the PRC signal such that fluctuations in frequency of the PRC signal correspondingly appear in the frequency of the clock signal. Thus, a clock signal traceable to a PRC generally has the same degree of accuracy as the PRC signal.

Based on the clock signal 49, the counter 50 produces timestamps for the transmit circuitry 41. The transmit circuitry 41, in accordance with PWE, is configured to insert, into each TDM packet, a timestamp, referred to hereafter as a "TDM timestamp," indicative of the approximate time of reception by the transmit circuitry 41 of a particular bit in the data signal 46 and subsequently packetized into the TDM packet.

In addition to TDM packets, the transmit circuitry 41 also transmits packets, referred to herein as "timing packets," to the receiver 29. The circuitry 41 is configured to insert into each timing packet a timestamp, referred to herein as a "synchronization timestamp," that is used by the receiver 29 to synchronize a clock signal from a local receiver clock to the transmitter clock signal 49. In one exemplary embodiment, the transmit circuitry 41 inserts the current timestamp from the counter 50 into the timing packet as the packet's synchronization timestamp such that this timestamp indicates the approximate time of transmission for the timing packet. Various types of protocols may be used for the timing packets. For example, in one embodiment, simple network time protocol (SNTP) is employed, but other types of protocols may be used in other embodiments. As will be described in more detail hereafter, the transmit circuitry 41 may be configured to transmit the timing packets to the receiver 29 periodically, randomly, and/or in response to requests from the receiver 29.

Figure 3:
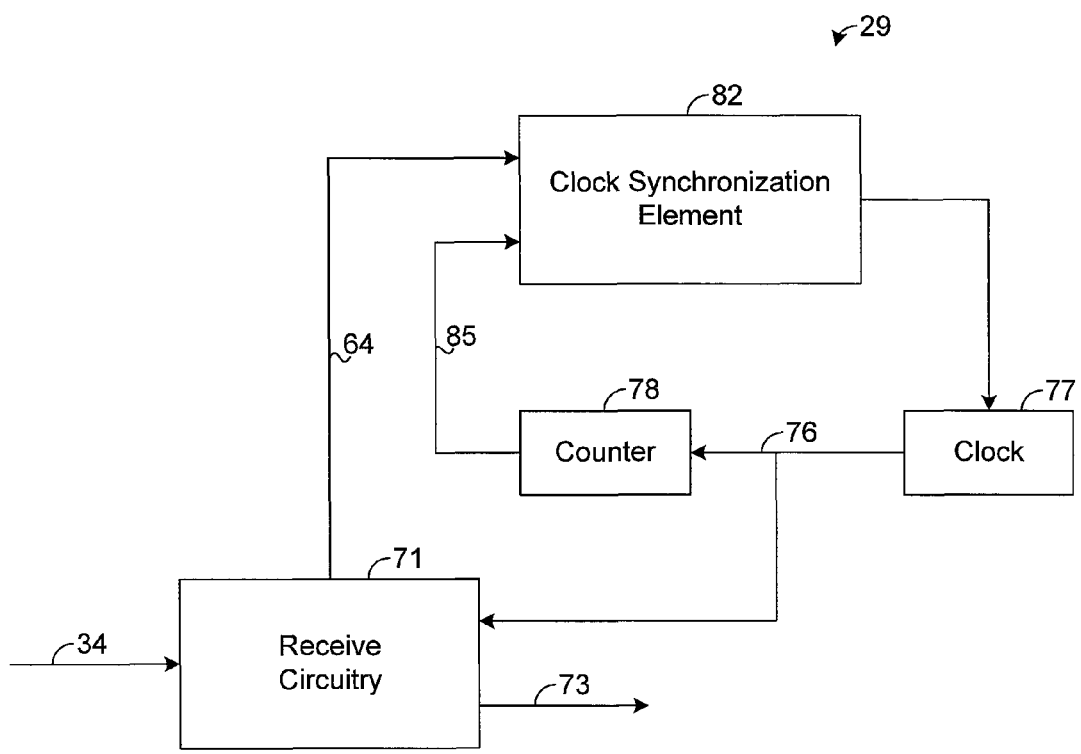
FIG. 3 is a block diagram illustrating an exemplary receiver, such as is depicted in FIG. 1.

FIG. 3 depicts an exemplary embodiment of the receiver 29. As shown by FIG. 3, the receiver 29 comprises receive circuitry 71, which can be implemented in hardware or a combination of hardware with software and/or firmware. The receive circuitry 71 is configured to receive timing packets via the signal 34 from the packet network 25 and to depacketize such packets. The synchronization timestamps from the timing packets are used to control a clock synchronization element 82 such that a local receiver clock 77 generates a clock signal 76 that is synchronous to the clock signal 49 (FIG. 2) of the transmit IWF.

The receive circuitry 71 also receives the TDM packets transmitted by transmitter 27. The data and TDM timestamps from the TDM packets are used to form a data signal 73 that contains the same data and is synchronous to the data signal 46 (FIG. 2) received by the transmit circuitry 41. In this regard, the signal 73, which is based on the clock signal 76 and the TDM timestamps, represents a regeneration of the original data signal 46 and shall be referred to hereafter as the "regenerated data signal 73." The receive circuitry 71 is able to keep the regenerated data signal 73 synchronous to the original data signal 46 since the receiver clock signal 76 remains synchronous to the transmitter clock signal 49.

In one exemplary embodiment, the clock synchronization element 82 is implemented in software and stored in memory (not specifically shown). In such an embodiment, the receiver 29 comprises a processing element (not shown), such as a digital signal processor (DSP) or a central processing unit, that can fetch and execute instructions of the element 82. Further, the element 82 can be stored on any computer-readable medium. In other embodiments, the clock synchronization element 82 can be implemented in hardware or any combination of hardware, software, and/or firmware.

A counter 78 receives the clock signal 76 and produces timestamps 85 based on the clock signal 76. Upon receiving a timing packet from the network 25, the receive circuitry 71 sends the synchronization timestamp 64 of such timing packet to the clock synchronization element 82, which also simultaneously receives a timestamp 85, referred to hereafter as the "receive timestamp 85," indicating the approximate time at which the timing packet was received by the receive circuitry 71. Based on the timestamps 64, 85, the clock synchronization element 82 is configured to track timing variations between the clock signals 49, 76 and to update the frequency of the clock 77, based on such timing variations, such that the clock signal 76 remains synchronous to the clock signal 49.

In one exemplary embodiment, which will be described in more detail hereafter, the clock synchronization element 82 implements a second-order loop filter using the difference between synchronization timestamp 64, which is based on the clock signal 49, and receive timestamp 85, which is based on the clock signal 76, as feedback to filter the phase error between the clock signals 49 and 76. However, in other embodiments, the clock synchronization element 82 may have other configurations and may implement other types of devices.

Figure 4:
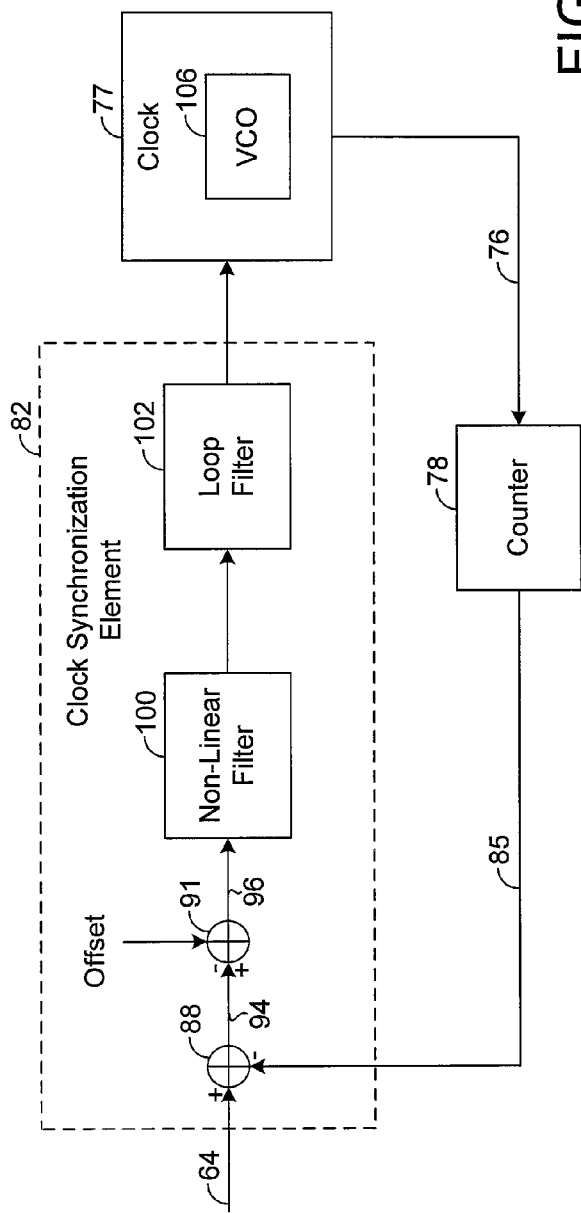
FIG. 4 is a block diagram illustrating an exemplary clock synchronization element, such as is depicted in FIG. 3.

FIG. 4 depicts an exemplary embodiment of the clock synchronization element 82. As shown by FIG. 4, the element 82 comprises a summer 88 that is configured to subtract the receive timestamp 85 from the synchronization timestamp 64. Such a timing measurement represents the packet delay for transmission through the network 25. A summer 91 subtracts an offset from the value 94 provided by the summer 88 to provide a value 96. Such a timing measurement, which is based on and indicative of the packet delay for the current packet, represents the phase error of clock signal 76 relative to clock signal 49. The value 96 is filtered by a non-linear filter 100, which will be described in more detail hereafter. The filtered value from the non-linear filter 100 is filtered by a loop filter 102. In one exemplary embodiment, the loop filter 102 is a second-order loop filter, such as is known in the art, but other types of filters may be used to implement the filter 102 in other embodiments.

The filtered value from the loop filter 102 is received by the clock 77, which is adjusted based on the loop filter value. In one exemplary embodiment, the clock 77 comprises a voltage controlled oscillator (VCO) 106, and circuitry of the clock 77 drives the VCO 106, based on the output of the loop filter 102, such that the average phase error is forced to approximately zero thereby ensuring that the clock signal 76 remains synchronous to the clock signal 49 of the transmitter 27.

The non-linear filter 100 is configured to filter the phase error values 96 such that the loop filter 102 receives phase error values 96 only from select timing packets, referred to hereafter as "update packets." Thus, only the update packets have an effect on the VCO 106, and the other timing packets do not have any effect on the VCO 106.

In one exemplary embodiment, a timing packet is determined to be an update packet if it is associated with a packet delay close to the minimum packet delay, as determined by the clock synchronization element 82, for transmitting packets from the transmitter 27 to the receiver 29. In one exemplary embodiment, the non-linear filter 100 is configured to establish a threshold and to provide a non-zero value to the loop filter 102 only if the magnitude of the phase error value being processed by the filter 100 is below the threshold, indicating that the phase error value is associated with a packet having a packet delay close to the determined minimum packet delay.

Figure 5:
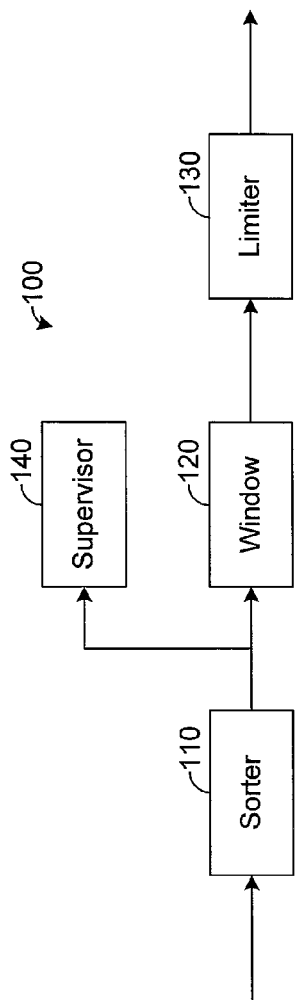
FIG. 5 is a block diagram illustrating an exemplary non-linear filter, such as is depicted in FIG. 4.

FIG. 5 depicts an exemplary embodiment of the non-linear filter 100. The filter 100 comprises a sorter 110, a window 120, a limiter 130, and a supervisor 140. In this regard, the sorter 110 sorts the values 96 received from the summer 91 over some time interval, referred to hereafter as the "sample period," and selects the smallest value 96. The duration of the sample period is sufficiently long such that there is a high probability that at least one packet experiencing the minimum possible delay or a delay very close to the minimum possible delay is received during the sample period. Moreover, increasing the duration of the sample period increases the probability that a packet experiencing the minimum possible delay or a delay close to the minimum possible delay will be received during the sample period.

In one exemplary embodiment, the duration of the sample period is selected based on the bandwidth of the loop filter 102. In this regard, the duration of the sample period is selected such that the filter 102 is updated about ten times more often than its time constant. For example, if the filter 102 has a bandwidth of 0.01 Hertz (Hz), then the filter's time constant is 100 seconds. Accordingly, the sample period is selected to be about 10 seconds. Updating the filter 102 less often increases the risk that the clock synchronization element 82 may not lock onto the desired frequency correctly.

Moreover, the value selected by the sorter 110 is assumed to be from a packet that experienced the minimum possible delay during the sample period. In this regard, the selected value is the difference between the synchronization timestamp 64 and the receive timestamp 85 of the timing packet that experienced the smallest amount of network delay while being transmitted from the transmitter 27 to the receiver 29 during the sample period. An exemplary operation of the sorter 110 will be described in more detail below.

Figure 6:
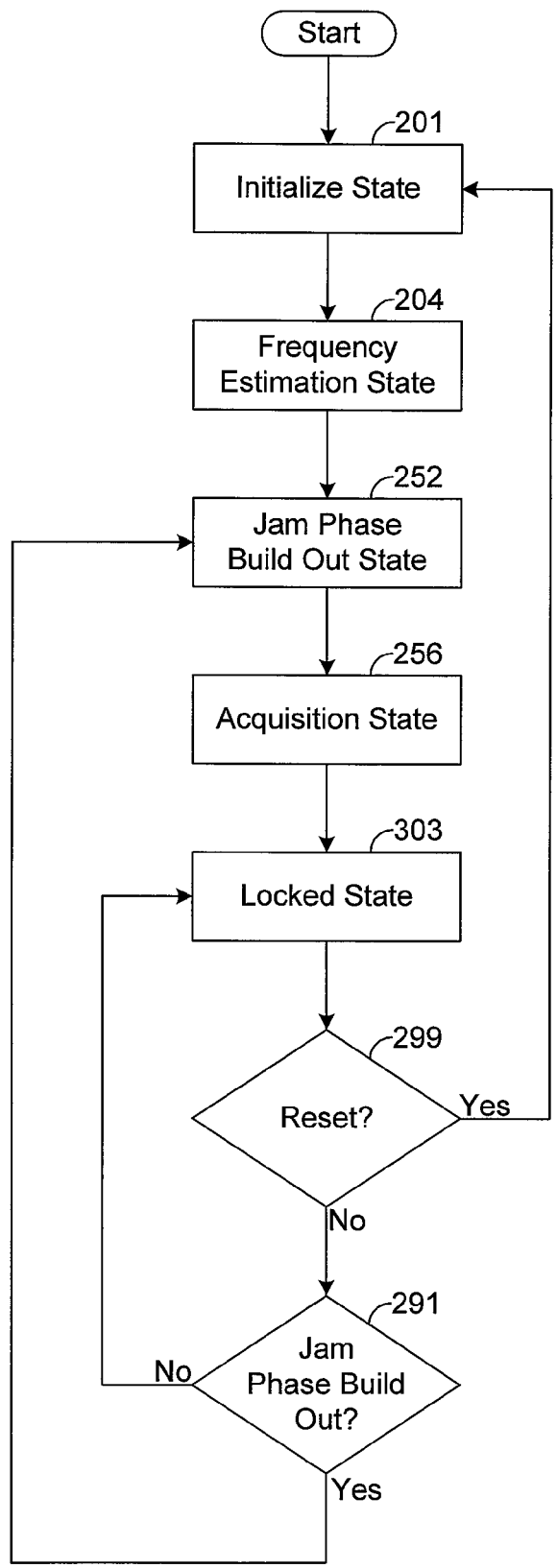
FIG. 6 is a flow chart illustrating an exemplary method for performing a phase locked loop.

As shown by block 201 of FIG. 6, the clock synchronization element 82 initializes various variables in a state, referred to as the "initialize state 201." For example, the offset used by the summer 91 is initialized to a value of zero in one embodiment. After the initialize state 201, the sorter 110 is used to perform a frequency estimate of the proper frequency for the clock 77 in a state referred to as the "frequency estimation state 204." In one exemplary embodiment, the frequency estimate is based on the minimum values sorted by the sorter 110 during at least two sample periods. In this regard, the sorter 110 sorts the phase error values 96 from the summer 91 for the duration of a sample period (e.g., 10 seconds) and identifies the minimum value 96 received during such period. Such value shall be referred to hereafter as "MIN1."

In one exemplary embodiment, the sorter 110 sorts by repetitively overwriting each previously received value 96 only if the current value 96 is less than all of the values 96 previously received during the sample period. In this regard, at the beginning of the sample period, the sorter 110 stores the first value 96 received, as shown by blocks 211, 214 of FIG. 7. For each newly received packet, the sorter 110 receives a new value 96 from summer 91. If the newly received value 96 is equal to or greater than the one stored in memory, the sorter 91 discards the newly received value 96. However, if the newly received value 96 is less than the one stored in memory, then the sorter 110 overwrites the stored value 96 with the newly received value 96, as shown by blocks 221-223 of FIG. 7. Thus, at the end of the sample period, the value 96 stored in memory is the smallest value 96 received during the sample period, and this value is output by the sorter 110, as shown by blocks 231, 233. In the present example, the transmitted value is identified as "MIN1."

The sorter 110 then waits for a period of time (e.g., 20 seconds) and then sorts the values 96 in another sample period (e.g., 10 seconds) once again. The minimum value 96 received during this second sample period shall be referred to hereafter as "MIN2." The sorter 110 calculates a value, "R," by dividing the difference between MIN1 and MIN2 by the delay (e.g., 30 seconds) between MIN1 and MIN2. Moreover, R represents a crude approximation of the rate that the phase is changing.

The sorter 110 sends R to the clock 77, which updates the frequency of the clock signal 76 in an effort to bring the frequency of the clock signal 76 closer to that of the clock signal 49 at the transmitter 27. Note that the frequency estimation process described above may be repeated, if desired, in an effort to further tune the clock 77 to the frequency of the clock 44 of the transmitter 27.

After estimating the frequency of the clock signal 49 and adjusting the clock 77 according to the frequency estimation state 204, the clock synchronization element 82 enters a state, referred to as the "jam phase build out state 252." In this state, a value for the offset used by the summer 91 is established. In one exemplary embodiment, the sorter 110 sorts the values 96 from the summer 91 for a sample period (e.g., 10 seconds) and selects the minimum value received as the offset. Thus, the offset is established to be the minimum estimated packet delay for a timing packet traveling from the transmitter 27 to the receiver 29 and it is expected that any value 94 received in the future will be equal to or greater than the offset in the absence of a significant network reconfiguration that would affect the minimum packet delay. Upon completion of the jam phase build out state 252, the offset remains constant unless the supervisor 140 determines that such a network reconfiguration has likely occurred. In such a case, the jam phase build out state 252 and the states described hereafter may be repeated in an effort to account for the network reconfiguration.

Figure 7:
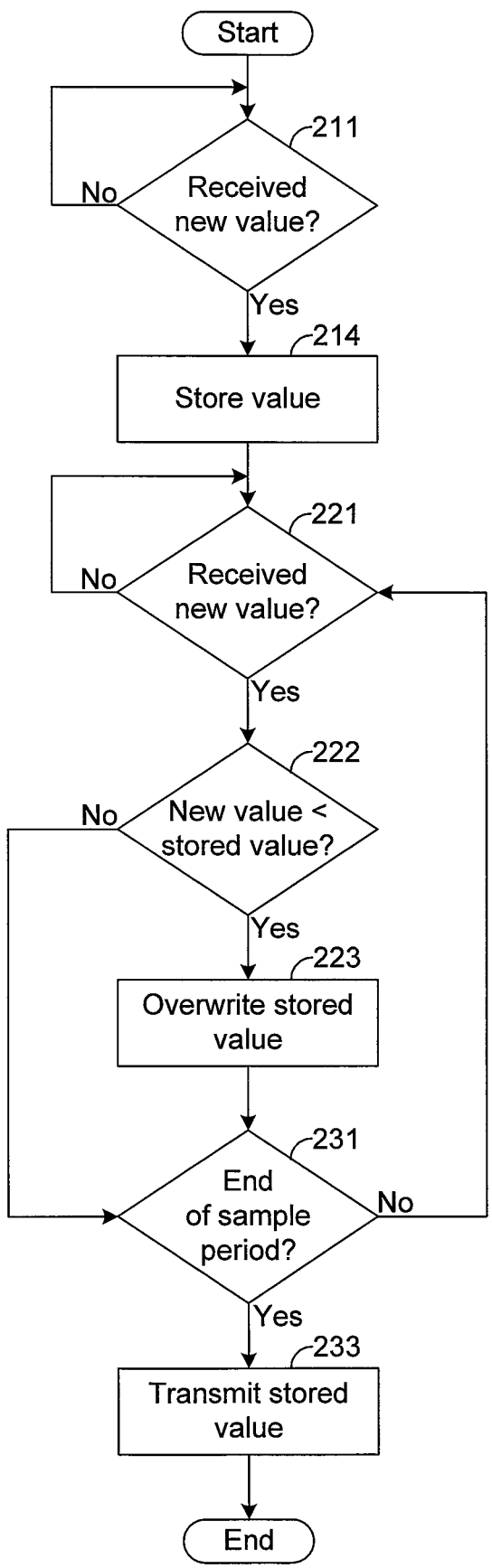
FIG. 7 is a flow chart illustrating an exemplary method for sorting phase error values.
Figure 8:
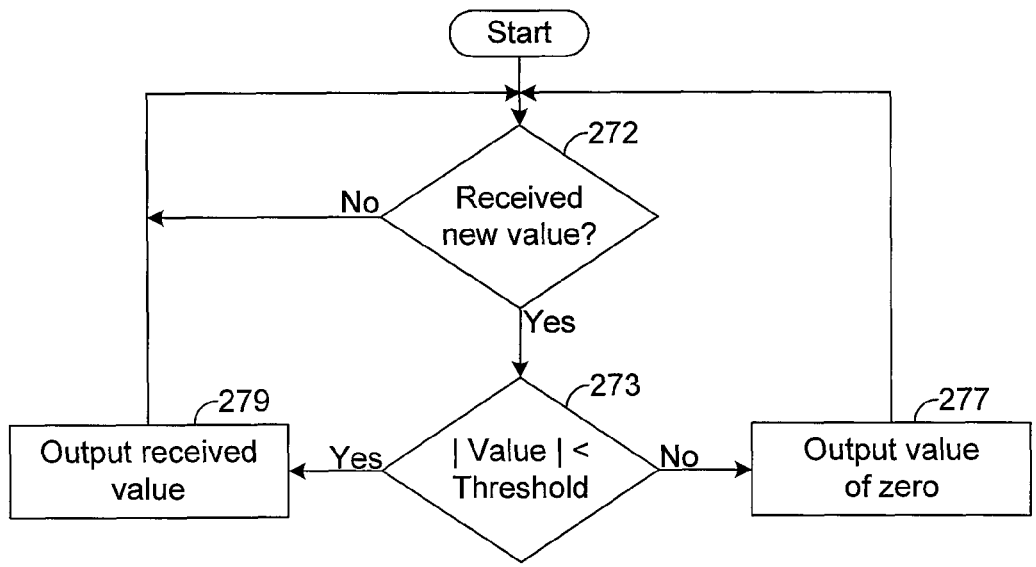
FIG. 8 is a flow chart illustrating an exemplary method for filtering phase error values.

After establishing the offset, the clock synchronization element 82 begins adjusting the clock 77 based on feedback (e.g., the receive timestamps 85 and transmit timestamps 64) in a state referred to as the "acquisition state 256." In other words, the loop is "closed." During the acquisition state, the sorter 110 periodically provides a sample value to the window 120, as shown by FIG. 7. In this regard, for each sample period (e.g., every 10 seconds), the sorter 110 outputs the minimum value 96 received during the sample period. For each such sample period, the window 120 compares the magnitude of received value 96 to a threshold, referred to hereafter as the "window threshold," as shown by blocks 272, 277 of FIG. 8. If the magnitude of the received value 96 exceeds the window threshold, the window 120 prevents the value from being received by the limiter 130. For example, the window 120 may simply send a zero value to the limiter 130 if the window threshold is exceeded, as shown by block 277 of FIG. 8. However, if the magnitude of the received value 96 is below the window threshold, then the window 120 sends the received value 96 to the limiter 130, as shown by block 279.

Note that the foregoing has the effect of sending to the limiter 130 phase error values 96 associated with timing packets that have experienced the minimum possible packet delay or a delay close to the minimum possible packet delay, as indicated by the window threshold. In this regard, a smaller window threshold requires a given phase error value 96 to be associated with a packet delay closer to the minimum possible packet delay.

In one exemplary embodiment, the window threshold is dynamically changed. In this regard, the window threshold is initially set to a relatively high value. As the clock synchronization element 82 adjusts the clock 77 thereby bringing the frequency of the clock signal 77 closer to that of the clock signal 49 of the transmitter 27, the window threshold is gradually decreased until at some point it is locked (i.e., held constant). In one exemplary embodiment, the window threshold is initially set to 100 microseconds.

Figure 9:
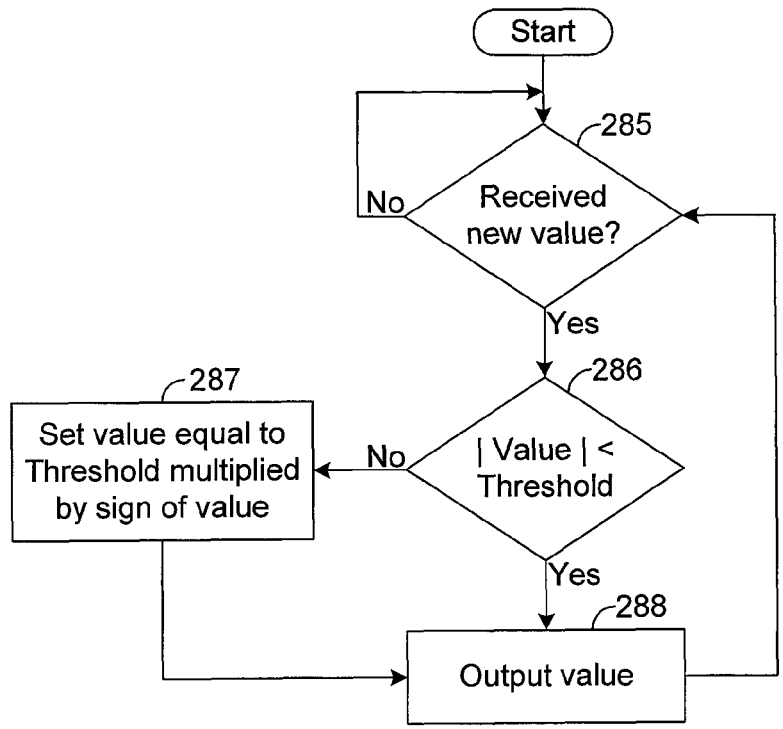
FIG. 9 is a flow chart illustrating an exemplary method for limiting filtered phase error values.

The limiter 130 is configured to limit the values received from the window 120 in an effort to suppress large gyrations in the frequency adjustments made to the clock 77. In this regard, the limiter 130 maintains a threshold, referred to hereafter as the "limit threshold." If the magnitude of the value received from the window 120 is greater than the limit threshold, then the limiter 130 reduces the value to the limit threshold multiplied by the sign of the value received from the window 120 before sending it to the clock 77, as shown by blocks 285-288 of FIG. 9. Otherwise, the limiter 130 transmits the value unmodified to the clock 77. Thus, the clock 77 does not receive a value with a magnitude greater than the limit threshold.

Like the window threshold, the limit threshold can be dynamically changed. In one exemplary embodiment, the limit threshold is initially set to a relatively high value. As the clock synchronization element 82 adjusts the clock 77 thereby bringing the frequency of the clock signal 77 closer to that of the clock signal 49 of the transmitter 27, the limit threshold is gradually decreased until at some point it is locked (i.a., held constant). In one exemplary embodiment, the limit threshold is initially set to 10 microseconds.

In one exemplary embodiment, the clock synchronization element 82 comprises a supervisor 140, which is enabled once the acquisition state 256 is initiated (i.e., the loop is "closed"). In this regard, the supervisor 140 determines the maximum value and minimum value output by the sorter 110 over some time interval. For example, in one embodiment, the interval is about 10 times that of the sample period. Thus, if the sample period is 10 seconds, then the supervisor interval is 100 seconds. That is, for each successive 100 second time period, the supervisor 140 determines the maximum value and minimum value output by the sorter 110. Note that the supervisor interval can be dynamically changed, if desired.

If the minimum sorter value for any supervisor interval exceeds a threshold, referred to hereafter as the "supervisor threshold," or if the maximum sorter output value for any supervisor interval is less than the negative supervisor threshold, then the supervisor 100 causes the clock synchronization element 82 to transition to the jam phase build out state 252, otherwise it remains in the locked state 303, as shown by block 291 of FIG. 6. In this regard, the supervisor 140 causing a transition to the jam phase build out state 252 may indicate that a network reconfiguration has occurred such that repeating the process described above from the jam phase build out state 252 would be desirable.

In addition, in one exemplary embodiment, the supervisor 140 maintains a variable, referred to hereafter as the "reset variable." For each supervisor interval, the reset variable is adjusted by the supervisor 140. In this regard, if the supervisor causes a transition to the jam phase build out state 252, then the reset variable is incremented by two. However, if the supervisor 140 does not cause a transition to the jam phase build out state 252, then the reset variable is decremented by one and limited to zero so that it cannot fall below zero. Moreover, if the reset variable ever exceeds a predefined threshold (e.g., 6), then the supervisor 140 makes a "yes" determination in block 299 of FIG. 6 and initiates a reset of the clock synchronization element 82. In this regard, the clock synchronization element 82 returns to the initialization state 201 and repeats the process described above. Performing a reset in such manner may help the clock synchronization element 82 to recover from an unanticipated event that causes significant clock synchronization problems.

Like the window threshold and the limit threshold, the supervisor threshold can be dynamically changed. In one exemplary embodiment, the supervisor threshold is initially set to a relatively high value. As the clock synchronization element 82 adjusts the clock 77 thereby bringing the frequency of the clock signal 77 closer to that of the clock signal 49 of the transmitter 27, the supervisor threshold is gradually decreased until at some point it is locked (i.e., held constant). In one exemplary embodiment, the supervisor threshold is equal to the window threshold. Thus, if the window threshold is initially set to 100 microseconds, then the supervisor threshold is also set to 100 microseconds. However, it is possible for the supervisor threshold to be different from the window threshold.

After initiating the acquisition state 256, the clock synchronization element 82 runs for a period of time (e.g., 100 seconds) with the initial limit threshold and window threshold. Then, the element 82 transitions to a state, referred to as the "locked state 303," in which the limit threshold, window threshold, and supervisor threshold are gradually decreased until they each respectively reach a minimum value. For example, in one embodiment, the thresholds are decreased according the below table.

| Duration (sec) | Loop Bandwidth | Window Threshold (usec) | Limit Threshold (usec) | Supervisor Threshold (usec) | Supervisor Interval (sec) |
|---|---|---|---|---|---|
| 100 | ~0.01 | 100 | 16 | 100 | 100 |
| 200 | ~0.005 | 50 | 8 | 50 | 100 |
| 400 | ~0.002 | 25 | 2 | 25 | 100 |
| ∞ | ~0.001 | 10 | 0.5 | 10 | 200 |

Thus, at the start of the acquisition state 256, the limit threshold is set to 16 microseconds (usec), and the window and supervisor thresholds are set to 100 microseconds. In addition, the supervisor interval is set to 100 seconds. After 100 seconds since the start of the acquisition state 256, the window threshold and the supervisor threshold are both reduced to 50 microseconds, and the limit threshold is decreased to 8 microseconds. After 200 seconds since the start of the acquisition state 256, the window threshold and the supervisor threshold are both reduced to 25 microseconds, and the limit threshold is decreased to 2 microseconds. After 400 seconds since the start of the acquisition state 256, the window threshold and the supervisor threshold are both reduced to 10 microseconds, and the limit threshold is decreased to 0.5 microseconds. In addition, the supervisor interval is increased to 200 seconds. The thresholds remain at the foregoing values unless the supervisor 140 resets the element 82 or transitions it to the jam phase build out state 252 in response to a determination that the supervisor threshold has been exceeded.

Moreover, during the acquisition state 256 and the locked state 303, the loop filter 102 is periodically provided with phase error values 102, and the VCO 106 is updated based on the filtered values from the loop filter 102 in an attempt to force the average phase error to a value of zero. In this regard, the clock synchronization element 82 operates similar to other known phase locked loops except that the values filtered by the loop filter 102 are first filtered by non-linear filter 100. Accordingly, the loop filter 102 receives values only associated with timing packets that have experienced a packet delay close to the minimum possible packet delay, as determined by the non-linear filter 100. The filtering performed by the non-linear filter 100 helps to prevent packet delay variation from significantly affecting the synchronization between clock 77 and the clock 44 at the transmitter 29. Since the clocks signals 77, 49 remain synchronous, the receive circuitry 71 is able to provide a regenerated data signal 73 that is synchronous to the original data signal 46 at the transmitter 29.

It should be emphasized that the threshold values described above are exemplary, and other threshold values are possible in other embodiments. Further, it would be apparent to one of ordinary skill in the art upon reading this disclosure that various modifications to the embodiments described above are possible without departing from the principles and the spirit of the present disclosure.

Note that there are a variety of techniques that can be used to ensure that a sufficient number of timing packets, as described above, are transmitted to the receiver 29 for enabling the receiver clock 77 to remain synchronous to the transmitter clock 44. For example, the receive circuitry 71 may be configured to periodically send a packet, referred to hereafter as a "request," to which the transmitter 27 responds by transmitting a timing packet to the receiver 29. The transmission of such requests from the receiver 29 may occur one-at-a-time at a periodic rate. Alternatively, the requests may be transmitted in bursts, which occur at a periodic rate. Alternatively, the request or burst of requests may be produced at random intervals.

In another approach, for each request timing packet sent by the receiver 29, the transmitter 27 is configured to send reply timing packets periodically or at random intervals for a specified period of time (e.g., until a timeout occurs). Further, the transmitter 27 is preferably configured to reset the timeout period for each new request timing packet received. In such an approach, the transmitter's response time is de-correlated from the receiver's request time.

Any of the foregoing approaches to ensuring a sufficient number of timing packets are received by the receiver 29 can be used with various types of protocols, including SNTP.

One exemplary embodiment utilizes the TDM packets transmitted by the transmitter 27 in order to transport synchronization timestamps. In this regard, the transmit circuitry 41 is configured to insert synchronization timestamps into the TDM packets. In such an embodiment, it is unnecessary for the transmit circuitry 41 to separately transmit timing packets as described above for at least some embodiments. In this regard, each TDM packet includes both a TDM timestamp, which is used in conjunction with the data in the TDM packet to produce the regenerated data signal 73, and a synchronization timestamp, which is used to adjust the frequency of the clock 77 such that the clock signal 76 remains synchronous to the transmitter clock signal 49. In this embodiment, the synchronization timestamps from the TDM packets may be processed by the clock synchronization element 82 in the same way described above for the synchronization timestamps for the timing packets. In this regard, for each TDM packet, the clock synchronization element 82 estimates the packet delay for the packet using the synchronization timestamp and determines whether such packet delay is within a specified range of (e.g., close to) estimated minimum packet delay. If so, such phase error is used to update the frequency of the clock 77 in an effort to force the average phase error to approximately zero.

According to PWE, TDM packets generally occur at a higher rate than those of some other protocols, such as SNIP, and therefore increase the probability that a given sample period will include a packet associated with a delay at or close to the minimum possible packet delay. Further, in using TDM packets, there is no need for a separate stream of timing packets thereby reducing traffic on the network 25. In other embodiments, other techniques for ensuring that the receiver 29 receives a sufficient number of packets containing timing information are possible.

Now, therefore, the following is claimed:

1. A packet receiver, comprising:
    receive circuitry configured to receive packets from a packet network, the packets transmitted by a transmitter based on a first clock;
    a second clock; and
    a clock synchronization element configured to perform timing measurements, each of the timing measurements indicative of a packet delay for a respective one of the packets, the clock synchronization element having a non-linear filter and a loop filter, the non-linear filter configured to collect the timing measurements into groups and to filter the timing measurements based on packet delay, each of the groups associated with a respective sample period and comprising a plurality of the timing measurements for the associated sample period, wherein the non-linear filter, for each of the groups, is configured to sort the plurality of the timing measurements of the group based on packet delays indicated by the plurality of the timing measurements of the group, the non-linear filter further configured to select a respective timing measurement from each of the groups based on the sorting performed by the non-linear filter and to determine which of the selected timing measurements indicate packet delays within a specified range, the non-linear filter configured to transmit each of the selected timing measurements indicating packet delays within the specified range to the loop filter, wherein the loop filter is configured to update a frequency of the second clock based on the timing measurements transmitted to the loop filter by the non-linear filter such that the second clock is synchronous to the first clock.

2. The receiver of claim 1, wherein one of the timing measurements is based on a timestamp included in one of the packets and a timestamp indicative of a time that the one packet is received by the receive circuitry.

3. The receiver of claim 1, wherein the non-linear filter comprises a window configured to filter the timing measurements based on whether magnitudes of the timing measurements exceed a window threshold.

4. The receiver of claim 3, wherein the non-linear filter comprises a sorter configured to send one of the timing measurements to the window in response to a determination that the one timing measurement has the lowest value in one of the groups.

5. The receiver of claim 1, wherein the clock synchronization element comprises a limiter configured to limit the timing measurements transmitted to the loop filter by the non-linear filter.

6. The receiver of claim 1, wherein the receiver is configured to transmit requests to the transmitter such that the transmitter, in response to the requests, transmits the packets periodically.

7. The receiver of claim 1, wherein the receiver is configured to transmit requests to the transmitter such that the transmitter, in response to the requests, transmits the packets randomly.

8. The receiver of claim 1, wherein the receive circuitry is configured to generate, based on the second clock, a data signal that is synchronous to a data signal received by the transmitter.

9. The receiver of claim 8, wherein the loop filter is configured to update the frequency of the second clock based on one of the timing measurements, wherein the one timing measurement is based on a timestamp in one of the packets, and wherein the data signal generated by the receive circuitry comprises data from the one packet.

10. The receiver of claim 8, wherein one of the packets comprises a first timestamp and a second timestamp, wherein the second timestamp is indicative of a time of transmission of the one packet from the transmitter, wherein the data signal generated by the receive circuitry is based on the first timestamp, and wherein one of the timing measurements is based on the second timestamp.

11. The receiver of claim 1, wherein the non-linear filter is configured to perform comparisons of the selected timing measurements to a threshold and to determine whether to transmit the selected timing measurements to the loop filter based on the comparisons.

12. The receiver of claim 11, wherein the non-linear filter is configured to dynamically change the threshold.

13. The receiver of claim 1, wherein the clock synchronization element is configured to form each of the timing measurements by mathematically combining a timestamp based on the first clock from a respective one of the packets and a timestamp from the second clock indicative of a time that the respective one packet is received by the receive circuitry.

14. The receiver of claim 1, further comprising a summer configured to receive a timestamp from one of the packets and a timestamp based on the second clock, wherein the timestamp based on the second clock is indicative of time that the one packet is received by the receive circuitry, wherein the summer is configured to subtract the timestamps thereby providing one of the timing measurements, and wherein the summer is configured to transmit the one timing measurement to the non-linear filter.

15. The receiver of claim 1, wherein the non-linear filter is configured to filter the timing measurements such that timing measurements based on packets associated with packet delays outside of the specified range are prevented from affecting the frequency of the second clock.

16. The receiver of claim 1, wherein the non-linear filter, for each of the groups, is configured to identify, based on the sorting performed by the non-linear filter, one of the timing measurements of the group indicating a packet delay lower than a packet delay indicated by at least one other timing measurement of the group and to select the identified timing measurement for transmission to the loop filter if the packet delay indicated by the identified timing measurement is within the specified range.

17. The receiver of claim 16, wherein the non-linear filter is configured to prevent, based on the sorting performed by the non-linear filter, the at least one other timing measurement from affecting the frequency of the second clock.

18. A packet receiver, comprising:
receive circuitry configured to receive packets from a packet network, the packets transmitted by a transmitter based on a first clock;
a second clock; and
a clock synchronization element configured to perform timing measurements indicative of packet delays for the packets, the clock synchronization element having a non-linear filter and a loop filter, the non-linear filter configured to sort the timing measurements based on the packet delays indicated by the timing measurements and to filter the sorted timing measurements based on the packet delays indicated by the timing measurements, the loop filter configured to control a frequency of the second clock based on the timing measurements filtered by the non-linear filter, wherein the non-linear filter is configured to filter the timing measurements such that timing measurements based on packets associated with packet delays outside of a specified range are prevented from affecting the frequency of the second clock.

19. The receiver of claim 18, wherein the non-linear filter comprises a limiter configured to limit the timing measurements.

20. The system of claim 19, wherein the non-linear filter comprises a window configured to perform comparisons between the timing measurements and a threshold, and wherein the window is configured to filter the timing measurements based on the comparisons.

21. The receiver of claim 18, wherein the non-linear filter is configured to filter the timing measurements based on at least one threshold, the clock synchronization element further comprising a supervisor configured to dynamically adjust the at least one threshold.

22. A method, comprising the steps of:
receiving packets from a packet network, the packets transmitted by a transmitter based on a first clock;

performing timing measurements based on timestamps included in the packets, each of the timing measurements indicative of a packet delay for a respective one of the packets;

filtering the timing measurements based on packet delays indicated by the timing measurements, the filtering step comprising the step of grouping the timing measurements into a plurality of groups, wherein each of the groups is associated with a respective sample period and comprises a plurality of the timing measurements for the associated sample period, wherein the filtering step, for each of the groups, comprises the step of sorting the plurality of the timing measurements of the group based on packet delays indicated by the plurality of the timing measurements of the group, and wherein the filtering step further comprises the steps of selecting a respective timing measurement from each of the groups, determining which of the selected timing measurements indicate packet delays within a specified range, and transmitting based on the determining step each of the selected timing measurements indicating packet delays within the specified range to a loop filter; and updating a frequency of the second clock via the loop filter based on the transmitted timing measurements such that the second clock is synchronous to the first clock.

23. The method of claim 22, wherein the filtering step comprises the step of limiting the timing measurements.

24. The method of claim 22, wherein the filtering step is based on at least one threshold, and wherein the method further comprises the step of dynamically updating the at least one threshold.

25. The method of claim 22, wherein the filtering step is performed such that timing measurements based on packets associated with packet delays outside of the specified range are prevented from affecting the frequency of the second clock.

* * * * *